(12) United States Patent
Huang (10) Patent No.: US 7,125,432 B2
(45) Date of Patent: Oct. 24, 2006

(54) METHOD FOR MAKING PRECIPITATED SILICA OR SILICATE COMPOSITIONS AND PRODUCTS THEREOF

(75) Inventor: Yung-Hui Huang, Bel Air, MD (US)

(73) Assignee: J.M. Huber Corporation, Edison, NJ (US)

( * ) Notice: Subject to any disclaimer, the term of this patent is extended or adjusted under 35 U.S.C. 154(b) by 0 days.

(21) Appl. No.: 10/898,502

(22) Filed: Jul. 23, 2004

(65) Prior Publication Data

US 2006/0027142 A1   Feb. 9, 2006

(51) Int. Cl.
*C09C 1/28* (2006.01)
*C09K 3/14* (2006.01)

(52) U.S. Cl. .......................... 51/308; 51/309; 106/482; 106/483; 106/484; 106/485; 106/486; 106/492; 423/335; 423/338; 423/339

(58) Field of Classification Search ................... 51/308, 51/309; 106/35, 482, 483, 484, 485, 486, 106/492; 423/335, 338, 339; 424/49, 52, 424/57
See application file for complete search history.

(56) References Cited

U.S. PATENT DOCUMENTS

| | | | |
|---|---|---|---|
| 5,512,271 A * | 4/1996 | McKeown et al. | 424/49 |
| 5,887,514 A | 3/1999 | Bielfeldt et al. | |
| 5,900,139 A | 5/1999 | Bielfeldt | |
| 6,403,059 B1 * | 6/2002 | Martin et al. | 424/49 |
| 6,419,174 B1 * | 7/2002 | McGill et al. | 423/335 |
| 6,652,611 B1 | 11/2003 | Huang et al. | |
| 2003/0019162 A1 * | 1/2003 | Huang | 51/307 |

FOREIGN PATENT DOCUMENTS

| | | |
|---|---|---|
| EP | 0 978 304 A2 | 2/2000 |
| WO | 97/00171 | 1/1997 |

* cited by examiner

*Primary Examiner*—Michael Marcheschi
(74) *Attorney, Agent, or Firm*—William Parks; Carlos Nieves (57) ABSTRACT

New methods of producing narrower particle size distribution precipitated silica and/or silicate materials are provided. Such a method permits a significant reduction in manufacturing costs through the utilization of more efficient drying/evaporation components, in essence, in one potentially preferred embodiment, production of such silica and/or silicate materials followed directly by a hydraulic chamber press filtering step combined with vacuum dewatering subsequently leading to the needed resultant particle comminution. The resultant precipitated silicas and/or silicates produced thereby exhibit greater density prior to comminution and thus greater propensity for more uniform milling than previously utilized and prevalent spray/flash drying apparatuses. Also encompassed within this invention are the resultant precipitated silica and/or silicate particles produced, including those that surprisingly exhibit extremely high transmittance properties, thereby potentially providing excellent narrow particle distribution silica materials for clear (transparent) end-uses.

6 Claims, 1 Drawing Sheet

US 7,125,432 B2

METHOD FOR MAKING PRECIPITATED SILICA OR SILICATE COMPOSITIONS AND PRODUCTS THEREOF

FIELD OF THE INVENTION

New methods of producing narrower particle size distribution precipitated silica and/or silicate materials are provided. Such a method permits a significant reduction in manufacturing costs through the utilization of more efficient drying/evaporation components, in essence, in one potentially preferred embodiment, production of such silica and/or silicate materials followed directly by a hydraulic chamber press filtering step combined with vacuum dewatering subsequently leading to the needed resultant particle comminution. The resultant precipitated silicas and/or silicates produced thereby exhibit greater density prior to comminution and thus greater propensity for more uniform milling than previously utilized and prevalent spray/flash drying apparatuses. Also encompassed within this invention are the resultant precipitated silica and/or silicate particles produced, including those that surprisingly exhibit extremely high transmittance properties, thereby potentially providing excellent narrow particle distribution silica materials for clear (transparent) end-uses.

BACKGROUND OF THE INVENTION

Precipitated silicas and/or silicates find use in a broad range of manufactured products ranging from cosmetic and food products to industrial coatings (such as for paper as one example) and elastomeric materials, such as tires. Silicas are particularly useful in dentifrice products (such as toothpastes) where they function as fillers, abrasives, and thickeners, as well as anti-caking agents and glidants for food and pharmaceutical uses. Because of this functional versatility, and also because silicas have good cleaning ability, are relatively safe, and have high compatibility with typical dentifrice ingredients like humectants, thickening agents, flavoring agents, and therapeutic agent such as anti-caries agents, there is a strong desire among toothpaste and dentifrice formulators to include them in their products. Silicates are utilized as active ingredients, such as oil absorbers and odor absorbers, as some examples, as well as additives for various physical and chemical purposes, such as viscosity modification, again, as one example within a number of different formulations, such as personal care compositions, antiperspirants, and other like products, and as paper coating agents and/or anti-caking agents. Such silicates (for example, sodium aluminosilicate) exhibit effective thickening, absorption, etc., characteristics as well as effective compatibility with much the same added ingredients listed above for silicas.

As known, synthetic precipitated silicas generally are produced by the de-stabilization and precipitation of amorphous silica from soluble alkaline silicate by the addition of a mineral acid and/or acid gases under conditions in which primary particles initially formed tend to associate with each other to form a plurality of aggregates (i.e., discrete clusters of primary particles), but without agglomeration into a three-dimensional gel structure. The resulting precipitate is separated from the aqueous fraction of the reaction mixture by filtering, washing, and drying procedures, and then the dried product is mechanically comminuted in order to provide a suitable particle size. Silicates are produced generally in the same manner by reacting sodium silicate with appropriate reactants to produce the desired silicate; i.e. calcium hydroxide to produce calcium silicate, magnesium hydroxide to produce magnesium silicate, aluminum sulfate replacing the mineral acid to produce an aluminosilicate. Mixed metal silicates can likewise be produced, i.e. sodium magnesium aluminosilicate by reacting sodium silicate, magnesium hydroxide and aluminum sulfate, or calcium magnesium silicate by reacting sodium silicate, calcium hydroxide, and magnesium hydroxide, as non-limiting examples.

The silica and/or silicate drying procedures are conventionally accomplished using spray drying, nozzle drying (e.g., tower or fountain), flash drying, rotary wheel drying, oven/fluid bed drying, and the like, which often require considerable expenditures for equipment and operating costs. The conventional drying procedures tend to reduce the ability to control final product physical properties and increase the chance of contamination. A similar issue is associated with other synthetically derived polishing agents, such as silica gel and precipitated calcium carbonate (PCC).

Additionally, precipitated silicas intended for dentifrices require comminution in order to reduce the particle size of the dried precipitated silica product down to a size that does not feel gritty in the mouth of a dentifrice user, while, on the other hand, not being so small as to lack sufficient polishing or thickening action. That is, in conventional practice, the median particle size of the silica in the reactor formed by acidulation of a metal silicate is too large for dentifrice applications and the like. To comminute silica particulates, grinding and milling equipment are used, such as a hammer or a pendulum mill used in one or multiple passes, and fine grinding has been performed, for example, by fluid energy or air-jet mill.

It has been found previously that narrow particle size distribution of comminuted precipitated silica materials provides very effective cleaning, polishing, and abrasion benefits for dental applications. Prior methods of precipitated silica production have proven effective to a certain extent for producing excellent materials for such purposes; however, it has also been found that such expensive spray/flash drying processes produce silica materials prior to comminution that exhibit an appearance and configuration that makes uniform milling for narrow particle size distribution results problematic. At the very least, such production methods result in a significant and appreciable amount of silica particles that exhibit particle sizes too great for effective utilization within such dental cleaning applications. Hence, not only are costs inflated through incorporation of the aforementioned spray/flash drying production steps, but the need to separate the unacceptably high particle size silica particles from the resultant precipitated materials also contributes to costs and inefficiency within the overall manufacturing procedure.

Furthermore, it has been desirable from a consumer aesthetic perspective to provide clear formulations of dentifrices within the pertinent market. Generally, silica particles are opaque in appearance and thus create difficulty when attempting to generate a clear or transparent gel or liquid toothpaste composition. It has been found in the past that certain manufacturing schemes could facilitate production of certain relatively high light transmittance precipitated silica materials to permit introduction of such a highly desired clear and/or transparent resultant dentifrice within the industry. However, even with such a possibility available, the highest transmittance level reliably provided by abrasive silicas was found to be at or around 70–75% on a reliable, consistent manufacturing basis. Thus, there remains the potential for significant improvement in this area with the evident possibility of providing greater amounts of effective silica particles (preferably exhibiting the above-discussed narrow particle size range for maximum dental abrasion and cleaning) within clear dentifrice gels, pastes, and/or liquids.

Additionally, the prevalent manufacturing methods for abrasive dental silicas have produced resultant materials that exhibit certain properties that, although not damaging or dangerous, leave room for improvement. Such properties include a propensity for dust generation from powdered silicas made via a process including at least one spray/flash drying step; difficulty in providing structural integrity in terms of consistently producing controlled low-structure silicas due to the number of process steps required for powdered silica manufacture; and suspect reliability in terms of reproducible narrow ranges of pellicle cleaning ratios and/or radiation dentin abrasion characteristics without potentially resorting to increased costs through separation methods of unwanted particle size silica materials.

Other issues that have arisen with such typically and traditionally produced silica and/or silicate materials include the need to ensure that pre-spray dried materials exhibit sufficiently low viscosities (and thus are relatively low in solids content) to prevent clogging of atomizers and other spray-drying equipment. The costs involved with such assurances may create increases to the silica and/or silicate manufacturer and/or dentifrice (or other type of composition if silicates are involved) producer that may be passed on to the consumer. Thus, the ability to overcome at least some of these issues, as well as provide suitable silica materials in terms of packing density (for storage and shipment), flowability (to facilitate transfer during incorporation into dentifrice formulations, at least), and, as noted above, a proper narrow particle size distribution, all without incurring increased manufacturing, additive, and/or separation costs, are all desirable for an improved production method for silicas and/or silicates, and, in particular, abrasive dental silica materials.

Therefore, a manufacturing method for precipitated silica and/or silicate materials that can provide not only lower costs and greater production efficiencies to the producer and highly effective cleaning and abrasion levels, or thickening capabilities (all due to easily produced narrow particle size ranges without waste particles outside such a range requiring sequestration and removal)(for silicas), or similar or other properties in terms of silicate materials, with possible higher light transmittance properties would be of great benefit both to the pertinent industry and to the aesthetic tastes of consumers. Unfortunately, to date, there have been no such advancements within the precipitated silica and/or silicate production industry.

SUMMARY OF THE INVENTION

The above and other objectives, advantages and benefits are achieved by the present invention directed to a method of making precipitated silica compositions without the need for costly, conventional spray drying, nozzle drying, flash drying, rotary wheel drying, oven/fluid bed drying, and the like.

In one aspect, the invention is directed to a method for preparing a precipitated silica composition, comprising the steps of introducing, into a reactor container, reaction mixture contents comprising alkali silicate and acid with intermixing thereof to form a suspension of precipitated silica; partially dewatering the reaction mixture after forming the precipitated silica by feeding the suspension into a chamber filter press in which the suspension is initially filtered in a plurality of chamber filter plates which provide first filter cake material; further dewatering the first filter cake under reduced pressure in the interior of the chamber filter with heating to provide second filter cake material having a solids content of 15 to 95% by weight, preferably from 50 to 90% by weight, and more preferably from 60 to 80% by weight; and milling the precipitated silica of the second filter cake material to achieve a dry, free flowing, precipitated silica powder of desired median particle size. These steps are conducted without the intervening step of conventional drying being performed on the precipitated silica by spray drying, nozzle drying, flash drying, rotary wheel drying, oven/fluid bed drying, and the like. For silicates, the method is essentially the same in terms of avoiding a spray/flash drying step and substituting it with one as noted above or with other like types or discussed herein, except that the reactants to form the silicates are generally selected from sodium silicate, alum (aluminum sulfate) and magnesium hydroxide.

Overall, the invention encompasses a method for preparing particulate materials selected from the group consisting of silica, silicates, or any mixtures thereof, said method comprising the steps of:

a) introducing, into a reactor container, reaction mixture contents comprising reactants effective to form a suspension of water-insoluble silica or silicate particles;

b) feeding the suspension into a chamber in which the silica or silicate particles are subjected to a chamber filter press in order to wash and partially dewater the suspension to produce silica or silicate filtered material;

c) further dewatering the filtered material under reduced pressure in the interior of the same chamber filter press as utilized in step "b" and with simultaneous heating to produce silica or silicate crumble material having a solids content of 14.5 to 85% by weight; and d) comminuting the resultant silica or silicate crumble material from step "c" to a preselected particle size distribution range.

In a preferred aspect, the method according to this invention is manipulated in manners described herein effective that the precipitated silica and/or silicate particles in the product compositions have a median particle size of about 1 micron to about 30 micron, more preferably about 3 micron to about 17 micron.

This method according to the invention is performed without any intervening dehydration of the abrasive particles into a flowable dry particle mass, or which otherwise would reduce the water content of the filter cake below 5 wt % and more preferably not below about 10 wt % before performing the aforementioned milling procedure on the cake.

Preferably, the comminuting used in the above-mentioned various embodiments of the invention is accomplished by grinding and milling equipment, such as a hammer or a pendulum mill, and fine grinding by, for example a fluid energy or air-jet mill, either as a single stage or multi-stage procedure.

The milling procedure further dehydrates the precipitated silica filter cake material to achieve a dry, free flowing, precipitated silica powder of desired median particle size. The water content of the final, comminuted silica is below 12 wt % and more preferably below 9 wt %.

The method of the invention can be practiced more economically because the time as well as the equipment and operating costs otherwise required for extreme particle drying procedures are eliminated.

DETAILED DESCRIPTION OF THE PREFERRED EMBODIMENTS

All parts, percentages and ratios used herein are expressed by weight unless otherwise specified. All documents cited herein are incorporated by reference. The following describes preferred embodiments of the present invention, which provides silica for use as abrasive or thickening agents in dentifrices, such as toothpastes, or silicates as active or added ingredients within various types of compositions as well. While the optimal use for this silica is in dentifrices, this silica may also be used in a variety of other consumer products.

By "mixture" it is meant any combination of two or more substances, in the form of, for example without intending to be limiting, a heterogeneous mixture, a suspension, a solution, a sol, a gel, a dispersion, or an emulsion.

By "dentifrices" it is meant oral care products such as, without intending to be limiting, toothpastes, tooth powders and denture creams.

The term "crumbles" is intended to encompass a silica and/or silicate material that exhibits a product form between that of a slurry and a powder such that the solids content present therein is between 35–85% (and thus a moisture content of 15–65%) for low structure silica and the solids content present therein for high structure silica is between 14.5–85% (with a complementary moisture content of from 15–85.5%). Such a silica and/or silicate product further exhibits, due to amount of moisture present therein, a tendency to remain agglomerated without easily falling apart through Van der Waals forces, hydrogen bonding, etc., provided through the presence of such moisture. As slurries of silica particles generally exhibit excessively high moisture levels (and thus very low solids content by weight, at least lower than 30% for low structure silica and below 12% for high structure silica), and powders are substantially free from any moisture content (the solids content is generally greater than 95% for either type of structured silica), the moisture level and ability to provide a granular or pasty silica product that does not appreciably fall apart unless excessive physical forces are applied thereto is one that would be easily understood by the practitioner.

This invention relates to a method of making precipitated silica compositions, also known as silicon dioxide, or $SiO_2$, and more particularly, it relates to a method of making precipitated silica compositions with post-reactor dewatering and sizing of the silica particles being performed directly via hydraulic chamber press filtering combined with vacuum dewatering, followed by comminution. This invention also relates to products of this process scheme.

Figure 1:
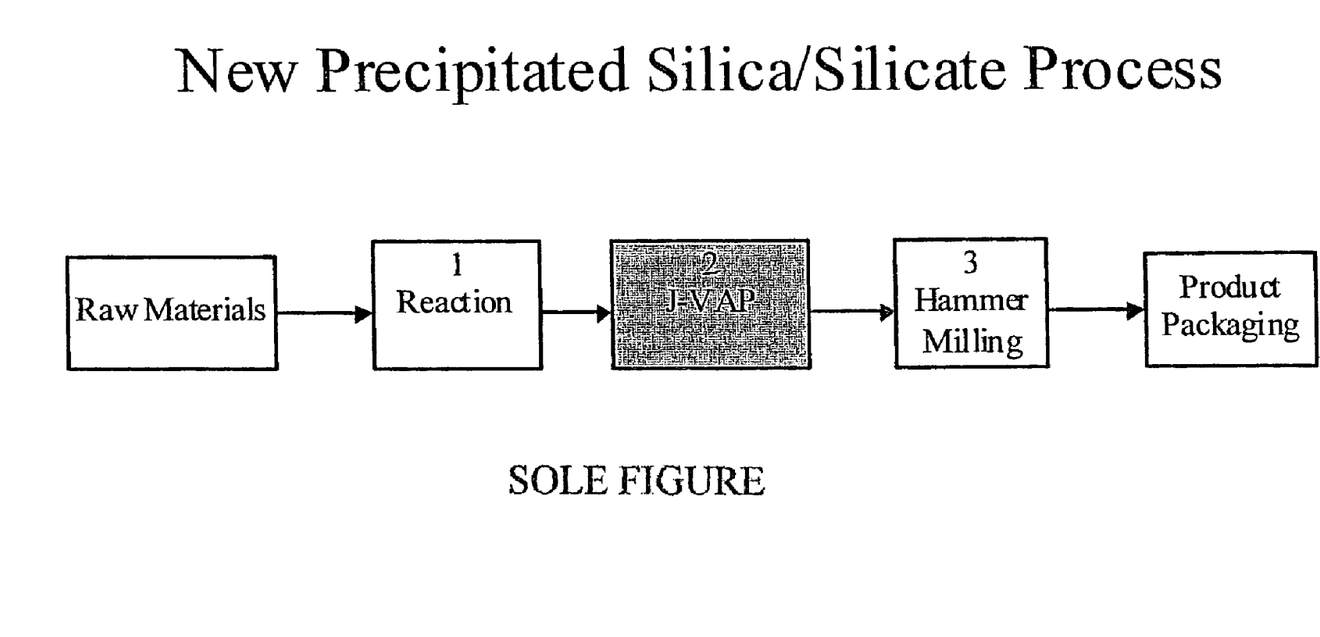
The sole FIGURE is a process flow chart of a preferred method scheme for producing precipitated silicas according to the invention.

Referring to the sole FIGURE, a generalized processing scheme is illustrated for making a precipitated silica according to a preferred embodiment of the invention. The process includes a reaction step (1); a dewatering step (2); and a milling step (3), which are discussed in greater detail below.

In the first step of the processing scheme, an acidulation reaction 1 is performed to precipitate silica. The initial acidulation reaction is performed in a reaction system equipped with suitable heating equipment. In general, the precipitated silicas made in step 1 may be prepared by a fresh water, or electrolyte solution, acidulation process wherein silica is precipitated by reaction of an alkali metal silicate and a mineral acid in aqueous solution. In the fresh water process, no electrolyte such as alum, $Na_2SO_4$, or NaCl, is present during the acidulation reaction.

Sodium silicate solution is charged to a reactor container or chamber including agitator to serve as initiating nuclei for the silica. The aqueous solution of sodium silicate in the container is then preheated to a temperature in the range of about 60 to 100° C., more preferably about 70 to 95° C. Prior to introduction into the reactor container, any remaining sodium silicate that may be added is preferably preheated to about 70 to 95° C. An acid solution is preferably preheated to about 30 to 35° C.

Although sodium silicate is illustrated, it will be understood that any suitable alkali metal silicate could be used. The term "alkali metal silicate" includes all the conventional forms of alkali silicates, as for example, metal silicates, disilicates and the like. Water soluble potassium silicates and sodium silicates are particularly advantageous with the latter being preferred. It should be taken into consideration that the mole ratio of the alkali silicate, i.e., the ratio of silica to alkali metal oxide, contributes, depending on other reaction parameters, to the average pore size of the silica products. In general, acceptable silica products of this invention can be made with silicate molar ratios ($SiO_2:Na_2O$) ranging from about 1.0 to 3.5 and preferably from about 2.4 to about 3.4. The alkali silicate solution supplied to the reactor vessel during various processing steps in the inventive method, as described elsewhere herein, generally can contain between about 8 to 35%, and more preferably between about 8.0% and 15.0%, by weight alkali metal silicate based on the total weight of the alkali metal silicate solution. In order to reduce the alkali silicate concentration of a source solution of alkali silicate to the above-indicated desired range, dilution water can be added to a source solution of alkali silicate before the silicate solution is fed into the reactor, or, alternatively, the dilution water can be combined in situ with the source solution of alkali silicate in the reactor used in the acidulation reaction step 1 with agitation-mixing to formulate the desired concentration of silicate in the alkali metal silicate solution.

The acid, or acidulating agent, can be a Lewis acid or Brönsted acid, and preferably is a strong mineral acid such as sulfuric acid, hydrochloric acid, nitric acid, phosphoric acid, and so forth, and more preferably sulfuric acid, added as a dilute solution thereof (e.g., at a concentration of between about 6 to 35 wt %, more typically about 9.0 to 15.0 wt %).

Once the reactor solution and remaining reactants have reached the desired temperatures, addition of acid or simultaneous addition of additional sodium silicate solution and acid into the reactor is commenced. The acid and sodium silicate solutions are metered into the reactor over an addition time of about 30 to 90 minutes. Rates of addition of the reactants depend upon the mole ratio, addition time and concentration of the silicate and the concentration of the acid. Generally, 2 moles sodium is neutralized with one mole sulfuric acid.

Optionally a water soluble metal salt adduct material such as a water soluble salt of aluminum, calcium, magnesium or zinc may be mixed with the acidulating agent and introduced into the reaction mixture along with the acidulating agent.

At the end of this addition period, most of the silica has precipitated. Additional acid is metered into the reactor until the reactor slurry reaches the desired pH. Once the slurry pH reaches about 7.0, it is preferable to reduce the acid flow rate until the slurry pH approaches the target pH, at which point the acid flow can be stopped and manual adjustment used to reach the target slurry pH. The preferred slurry pH is approximately 4.0 to 7.0, and more preferably between 4.5 to 6.0. At this juncture, the silica has precipitated to provide a mixture of the precipitated silica and the reaction liquor. Once the desired slurry pH is reached, digestion begins and the reaction temperature is raised to approximately 85–99° C., and preferably 91 to 97° C., and digestion is continued at the elevated temperature for approximately 5 to 60 minutes, and preferably for approximately 10 to 30 minutes. Acid is added during the digestion step to the extent necessary to maintain a constant pH.

After the digestion step is completed in the reactor used to implement step 1, and any subsequent pH adjustment conducted, the reaction batch is discharged from the reactor. Although the above-described general protocol are preferred for synthesizing the precipitated silica to be conditioned according to this invention, it will be appreciated that other grades of precipitated silicas, such as very low to very high structure synthetic silicas in accordance with the definitions set forth in J. Soc. Cosmet. Chem., 29, 497–521 (August 1978), and Pigment Handbook: Volume 1, Properties and Economics, 2nd ed., John Wiley & Sons, 1988, p. 139–159, generally can be used in the practice of this invention.

The resultant silica reaction slurry then requires further processing prior to comminution into suitably sized particles. Generally, such processing would include filtering and washing in order to remove by-products of salts and excess water therefrom, followed by the aforementioned expensive spray/flash drying step. However, again, as noted previously, such a standard procedure has exhibited certain drawbacks. For instance, it has been determined that the comminution procedure, generally undertaken through hammer milling, or similar type procedure, does not provide reliable narrow particle size ranges for such filtered then spray/flash dried silica materials. Without intending to be bound to any specific scientific theory, it is believed that the resultant precipitated silicas produced through this typical approach exhibit, prior to comminution, nonuniform appearances and configurations such that the structure of the pre-milled particles are "puffed" such that the appearances thereof are nonuniform in structure as well as density. Such particles appear thus to be difficult to uniformly introduce within a milling process. Milling apparatuses generally include a milling component within the bottom portion thereof, with an appreciable amount of headspace above such a component (although the chamber involved is sealed). When the "puffed" silica particles are introduced within such a milling apparatus, some will easily be milled initially, while others will remain within the headspace above the milling component portion. In such a situation, wherein the particles to be milled are nonuniformly introduced within the milling component itself, not to mention begin as differently sized and configured materials, the resultant milled silica particles will likewise exhibit subsequent differing particle sizes, albeit smaller than originally provided prior to milling. Basically, during milling, some of the particles will begin as different sized particles, but will be reduced in size to a uniform size with a large portion of the other particles milled simultaneously; however, since there will exist remainder portions of the milled particles, and since the pre-milled particles were of appreciably different sizes and configurations, these remainders portions of particles will create a significant disparity in the distribution of particle sizes for the overall resultant precipitated silica materials. Thus, there was found a need to utilize a different procedure to compensate for these differences and produce more uniformity to the extent that an acceptable narrow particle size distribution range could be provided.

Such a modification in the precipitated silica production scheme is reflected in the depiction within the sole FIGURE, as one non-limiting, though preferred, example. In step 2 of the New Precipitated Silica/Silicate Process illustrated therein, dewatering is performed on the reaction mass obtained from step 1. In one preferred aspect, so-called "J-Vap" processing, or similar chamber filter press processing, is preferred in the implementation of step 2 of the preferred embodiment of the invention as illustrated in THE SOLE FIGURE.

Non-limiting illustrations of methods and equipment arrangements for conducting such J-Vap processing that can be adapted for use in the practice of the filtering/dewatering step of the present invention can be found, for example, in U.S. Pat. No. 5,558,773 and EP 0 978 304 A2, which descriptions are incorporated herein by reference. Other examples of J-Vap processing equipment include commercially available equipment for this purpose, such as that illustrated in the working examples below. The J-Vap processing equipment employed must permit reliable and accurate control over the level of water removal to meet the criterion set forth herein for that parameter.

The J-Vap processing arrangement generally includes a series of reduction chambers in which the washing and dewatering of the reaction slurry is conducted. The reduction chambers are tightly clamped together in the filter press module. An energy conversion module also is included that supplies heated water for the pressurization of the reduction chambers and also includes a vacuum system used during dewatering performed after an initial pressure filtering stage.

In one exemplary suitable arrangement, the chamber filter press of the J-Vap processing system is selected as including a plurality of alternating diaphragm squeeze plates and filter plates covered by respective liquid-permeable filter membranes, in which the squeeze plates and filter plates define silica suspension introduction and flow passages therebetween, wherein the squeeze plates include a diaphragm that is expandable toward an adjoining filter plate effective to increase solid/liquid separation in the silica suspension in which liquid is transmitted through the adjoining liquid-permeable membrane, and the filter plates including respective interior filtrate drainage chambers for drainage of liquid filtered from the silica suspension.

During the initial filtering and washing stage of silica slurry supplied from the reactor, air blow down commences to remove surface water from the cake. Thereafter, the diaphragm is expanded by introduction of heated fluid effective to expand the diaphragm and heat the abrasive suspension effective to promote water removal from the filter material. That is, slurry from the reactor is pumped into the reduction chambers where filtration occurs and the free liquid is drained away. The silica filter material then undergoes a core blow down and is washed with water. Then a second air blow down commences to remove surface water from the cake. The diaphragm is expanded again to promote water removal from the filter material.

After the initial filtration and washing stage, vacuum-promoted dewatering is performed. For example, the reduction chambers are pressurized with heated water, and a vacuum is introduced. For example, in a second stage of the dewatering process as performed in the J-Vap processing system, the drainage chambers are connected to a vacuum source effective to remove vaporized portions of the silica suspension.

The dewatering time is set to achieve the desired water reduction. After the dewatering stages are completed, the reduction chambers are separated from one another and the dewatered filter cake material is discharged and proceeds to the milling step.

Illustrative, non-limiting conditions for conducting such J-Vap dewatering, when used to perform the dewatering step 2 in the sole FIGURE according to the preferred embodiment of the invention, include the following general conditions:

De-water time: 0 to 12 hours;
Feed Pressure: 10–80 psi (69–552 kPa);
Feed temp: 70–200° F. (21–93° C.);
Hot water temp: 120–200° F. (49–93° C.);
Blow down air pressure: 10–80 psi (69–552 kPa);
System Vacuum: 20–29 in. Hg (68–98 kPa);
Squeeze air pressure: 10–100 psi (69–670 kPa); and
Solids content out of J-Vap: 15–95%.

The reaction mass is filtered and washed with water to reduce the $Na_2SO_4$ level to less than 5%, and preferably less than 2%, by weight. The resulting dewatered crumbles generally contains about 15 to about 95 wt % solids content.

Alternatively, it has been found that a similar system, known as the Thermal cake Drying (or TCD) system, may be used as a substitute for this J-Vap process. This TCD method is basically a steam pressure dehydration process wherein a steam pocket is formed adjacent to a filter cake of the silica when the temperature exposed thereto exceeds the boiling point of the water present within the target cake. The cake is present between two plates such that once the steam pocket (cushion) is formed, it continues to increase in size to squeeze the target filter cake. Thus, in addition to the de-watering step through a membrane squeeze, as noted above, the de-watering is achieved through thermal energy rather than mechanical energy alone. Thus, this may be utilized as a substitute or in addition to the primary and preferred J-Vap method.

Referring now to the milling step 3 in the sole FIGURE, comminution is needed because the particles in the silica suspension drawn from the reactor of step 1 generally have a median particle size (MPS) of greater than about 50 μm to about 100 μm, and more typically about 65 μm to about 85 μm. These particles sizes are unacceptable for applications such as oral cleaning compositions. Namely, smaller silica particles are needed so that the particles are not gritty in texture to a user, yet the particles must be large enough to provide the requisite polishing action on teeth. For oral cleaning compositions, silica particle sizes between about 1 and about 30 μm are generally required, and a median particle size of between about 3 to 17 μm is preferred in this invention.

To comminute the silica particles (typically agglomerates) in step 3, the filter cake received after dewatering in step 2 is fed to a milling station. Preferably, no extraneous organic dispersant is added to the cake before milling is performed in step 3; however, such an added component may be included if desired. Either a single stage mill or a multi-stage milling operation in step 3 can be used. For example, the multi-stage milling station, in one embodiment, can be comprised of two or more separate mills through which the silica is successively progressed. Alternatively, the multi-stage milling station can be comprised of a single mill in which the silica is fed through the single mill in multiple passes using recirculation. The amount of energy dissipated into the feed silica at each mill stage, or in each pass through a single mill in a multi-pass form of multi-stage milling, generally is kept approximately the same, although this is not necessarily required. Multi-stage milling permits longer residence times to be applied.

The mill types used as described above can be a hammer, pendulum, fluid energy, air-jet mill and the like. One preferred type of mill used in the practice of this invention is a vertical Raymond® mill manufactured by ABB Air Preheater, Inc. (Lisle, Ill.). The Raymond® mill is a single stage hammer style mill.

In one preferred non-limiting illustration, the mill used to conduct step 3 in the sole FIGURE generally is operated under the following conditions:

Mill configuration: 2(U) and 2(L) or 8(U) and 6(L) whizzards.
Airlock feeder rate: 1.5–2 rpm In keeping with an objective of this invention of reducing silica particles without the need for conventional drying procedures, the total amount of shearing forces and heat applied to the press cake during milling should be sufficient to reduce the median particle size (MPS) to between about 1 to about 30 microns (μm), preferably between about 3 and about 17 microns, and yield a free flowing silica powder with less than 12% moisture, preferably less than 9% moisture. The abrasive particles in the milled abrasive composition have less than 1.5 wt % fraction of +325 mesh size particles (greater than about 45 μm). Thus, as opposed to the previous production methods including separate filtering and spray/flash drying steps, the particle size range for this novel procedure for silica/silicate production is more controlled within a narrow range for greater efficiency and cost reductions overall to the benefit of the producer and, ultimately, the consumer.

The silicas provided in the above-illustrated compositions are preferably characterized as synthetic hydrated amorphous silicas, known as silicon dioxides or $SiO_2$. These precipitated silicas can be characterized as very low to high structure synthetic silicas.

In addition to the above-described step 1 methodology of precipitating the raw synthetic amorphous silicas in the reactor, the preparation of the raw silica is not necessarily limited thereto and it also can be generally accomplished in accordance with the methodologies described, for example, in prior U.S. Pat. Nos. 3,893,840, 3,988,162, 4,038,098, 4,067,746, 4,340,583, 4,420,312, 5,225,177 and 5,891,421, all of which are incorporated herein by reference, as long as such methods are appropriately modified to append the post-processing treatment(s) used in at least steps 2 and 3 of the preferred inventive method, as illustrated in the sole FIGURE and discussed above. Likewise, silicates such as alkaline earth metal silicates, particularly, though not necessarily, calcium and magnesium silicates, as well as other metal and mixed metal silicates, such as zinc silicate, calcium magnesium silicate, sodium aluminosilicate, sodium magnesium aluminosilicates, and the like, may be generally produced in accordance with the methodologies described, for example, within prior U.S. Pat. Nos. 2,739,073, 3,228,784, 3,798,046, 3,834,921, 4,557,916, and co-pending U.S. patent application Ser. No. 10/666,386, all of which are incorporated herein by reference, as long as such methods are appropriately modified to append the post-processing treatment used in at least steps 2 and 3 of the preferred inventive method described herein. As will be appreciated by one skilled in the art, reaction parameters which affect the characteristics of the resultant precipitated silica include: the rate and timing at which the various reactants are added; the levels of concentration of the various reactants; the reaction pH; the reaction temperature; and/or the rate at which any electrolytes are added.

The precipitated silica compositions of this invention generally have the following properties: linseed oil absorptions between about 40 to about 230 cc/100 g, RDA (Radioactive Dentin Abrasion) values between about 30 to about 200, PCR (Pellicle Cleaning Ratio) values of 50 to 200, and a % Transmittance (% T) greater than about 60. Although silicas have been illustrated herein as the water insoluble particle compositions being produced by this invention, it will be understood that the principles of the present invention are also considered applicable to other water-insoluble particles that can be synthesized in a reactor without the need for any intervening conventional drying. Other such water-insoluble particles include, for example, silica gels, dicalcium phosphate or its dihydrate forms, calcium pyrophosphate and precipitated calcium carbonate (PCC).

Examples of use of these optional dentifrice abrasives are described herein and/or, for example, in Reissue No. 29,634, and U.S. Pat. Nos. 5,676,932, 6,074,629, and 5,658,553, and the patents cited therein, all being incorporated herein by reference. These optional ingredients, if used, can be used at levels that are customarily seen in dentifrice formulations.

The precipitated silica compositions of the above-described inventive product (available at step 3 in the sole FIGURE), when incorporated into dentifrice compositions such as toothpaste, is present at a level of from about 1% to about 50% by weight, more preferably from about 1% to about 35% by weight, depending on the silica properties and the intended function of the silica (abrasive or thickening agent) in the formulation. Overall dentifrice or oral cleaning formulations incorporating the compositions of this invention conveniently can comprise the following possible ingredients and relative amounts thereof (all amounts in wt %):

Dentifrice Formulation:

| Ingredient | Amount |
| --- | --- |
| Liquid Vehicle: | |
| humectant(s)(total) | 5–70 |
| deionized water | 5–70 |
| binder(s) | 0.5–2.0 |
| Therapeutic agents | 0.1–2.0 |
| chelating agent(s) | 0.4–10 |
| silica thickener | 3–15 |
| surfactant(s) | 0.5–2.5 |
| Abrasives | 10–60 |
| sweetening agent | <1.0 |
| coloring agents | <1.0 |
| flavoring agent | <5.0 |
| preservative | <0.5 |

The presence of other silica abrasives, in addition to the type produced via the inventive method described herein, as well as two or more silica abrasives made via such a method, are encompassed within the term "abrasives" within the above Dentifrice Formulation. The term "Therapeutic agents" includes materials such as, without limitation, antimicrobial agents (cationic, anionic and nonionic) and anti-caries agents as well as any other type of typical component within dentifrice formulations that provide therapeutic effects to the teeth and/or gums of the user. Suitable antimicrobial agents include bisguanides, such as alexidine, chlorhexidine and chlorhexidine gluconate; quarternary ammonium compounds, such as benzalkonium chloride (BZK), benzethonium chloride (BZT), cetylpyridinium chloride (CPC), and domiphen bromide; metal salts, such as zinc citrate, zinc chloride, and stannous fluoride; sodium monofluorophosphate, stannous fluoride, and the like sanguinaria extract and sanguinarine; volatile oils, such as eucalyptol, menthol, thymol, and methyl salicylate; amine fluorides; peroxides and the like. Therapeutic agents may be used in dentifrice formulations singly or in combination.

The following examples are presented to illustrate the invention, but the invention is not to be considered as limited thereto. In the following examples, parts are by weight unless indicated otherwise.

EXAMPLE 1

Precipitated silicas were prepared in a reactor as follows, and thereafter were subjected to certain dewatering and milling described below, without any conventional spray drying occurring. Two batches of silica, were prepared according to the process below and combined together to provide Example 1 silica.

Example 1 precipitated silica was prepared by adding 34 L of sodium silicate (13.0%, 2.5 mole ratio of $SiO_2:Na_2O$; preheated to 75° C.) to a reactor as reaction medium. The batch was heated to 85° C. and the agitator speed was set at 50 rpm. Sodium silicate (13.0%, 2.5 mole ratio of $SiO_2$:$Na_2O$; preheated to 75° C.) and sulfuric acid (11.4%) were then simultaneously added to the reactor. Sodium silicate addition rate was 12.8 L/min and acid addition rate was 3.8 L/min. The simultaneous addition of sodium silicate and sulfuric acid continued for 47 minutes, after which time the sodium silicate addition was discontinued. The acid flow was continued until the batch reached pH 5.5–5.8, at which time the acid flow was stopped. The batch was digested at 93° C. for 10 minutes and the pH adjusted to between 5.5 and 5.8, as necessary. The batch was then dropped (discharged from the reactor). Two exact batches of this silica were prepared as described above and then combined as Example 1 silica.

Example 1 silica prepared as described above was dewatered in a J-Vap dewatering system (model JVAP 470/100 available from US Filter Corporation, Holland, Mich.) under the conditions listed in Table I below. Specifically, the silica reaction slurry at about 6.2% solids was agitated and heated to the desired feed temperature, then was pumped at 20 psi for about 1.5–2 minutes into the J-Vap system. Pressure squeeze (SQZ) and blow down (BD) air was initiated and continued for 1–2 minute. Next, core blow down and washing was initiated. Silica cake was washed with 60° C. water for 1.5–2 minutes while maintaining SQZ at 20 psi lower than wash water pressure (40 psi). Thereafter a second SQZ and BD was initiated and continued for 5 minutes. Finally, the silica cake was run under vacuum (28 inch Hg) and SQZ for six hours. Hot water (80° C.) was recirculated through the J-Vap system to remove excess water from the product. Solids content was measured on the dewatered product by drying the resulting silica crumbles at 150° C. for 16 hours in an oven.

The Example 1 silica was fed into a 18" vertical Raymond® mill, manufactured by ABB Air Preheater, Inc. (Lisle, Ill.). The mill configuration and the silica feed rate via an airlock feeder are given in Table II below. No hammers were used in the silica milling process.

COMPARATIVE EXAMPLE 1

Silica was prepared according to the silica precipitation process in Example 1 but for comparison purposes was filtered, spray dried, and milled according to conventional methods such as that outlined in the "existing Precipitated Silica/Silicate Process" within the Sole FIGURE. After digestion, the silica was filtered on a 3'by 3' rotary drum vacuum filter (Ametek, Inc., East Moline, Ill.) having a total filter area of 28 square feet and washed until the filtrate had a conductivity of not more than 2000 μmhos. The filter cake was then slurried with water and mixed for 5 minutes with a Cowles agitator to form a cake slurry having the solids content listed in Table III, below. The cake slurry was then spray dried (at the inlet and outlet temperature shown in Table III, below) in a Niro F15 wheel atomizer spray dryer (Niro, Inc, Soeborg, Denmark) and milled in a Raymond® mill according to the conditions listed in Table II, below.

EXAMPLE 2

Precipitated silicas were prepared in a reactor as follows, and thereafter were subjected to the similar dewatering and milling processes described in EXAMPLE 1. Two batches of silica, were prepared according to the process below and combined together to provide EXAMPLE 2 silica.

EXAMPLE 2 precipitated silica was prepared by adding 600 L of sodium silicate (13.0%, 2.5 mole ratio of $SiO_2$:$Na_2O$; preheated to 76±1° C.) to a reactor as reaction medium. Sulfuric acid (11.4%) was then added to the reactor at 6.2 L/min until the batch pH reached 6.5. At batch pH 6.5, the acid flow rate was reduced to 2.0 L/min until the batch pH reached 5.8±0.1 and then the acid flow was stopped. The batch was digested at 93° C. for 30 minutes and the batch pH adjusted back to 5.8+/−0.1, as necessary. The batch was then discharged from the reactor.

EXAMPLE 2 silica prepared as described above was dewatered in a J-Vap dewatering system and milled in a Raymond® mill. The dewatering and milling conditions for EXAMPLE 2 are listed in Table I and II, respectively.

EXAMPLE 3

Precipitated silicates were prepared in a reactor as follows, and thereafter were subjected to similar dewatering and milling described below, without any conventional spray drying occurring. Two batches of silicates were prepared according to the process below and combined together to provide Example 3 silicates.

EXAMPLE 3 precipitated amorphous sodium magnesium aluminosilicate was prepared by adding 398 L of 11% aqueous sodium sulfate solution and 3.9 L of 50% aqueous magnesium hydroxide solution to a reactor as reaction medium and heating to 71° C. Clarified alum (24° C.; 5.4 kg/l) was added at a rate of 2.9 L/min for 3.5 minutes and then the addition was paused for 2 minutes. Next, simultaneous addition of clarified alum (same rate as before) and sodium silicate (2.5 mole ratio of $SiO_2$:$Na_2O$; 0.4 kg/l) at rate of 7.0 L/min began and continued for a total of 35 minutes. After 35 minutes, the sodium silicate addition stopped and the alum addition continued for about another 1.5 minutes until the pH was reduced to 6.5. The alum addition was stopped and the sodium silicate addition was restarted for another 4 minutes to bring the reactor batch pH to 9.2. The reactor batch was digested for 15 minutes at pH 9.2 and 71° C. before discharging the batch from the reactor.

EXAMPLE 3 silicate prepared as described above was dewatered in a J-Vap dewatering system and milled in a Raymond® mill. The dewatering and milling conditions for EXAMPLE 3 are listed in Table I and II, respectively.

EXAMPLE 4

Precipitated silicates were prepared in a reactor as follows, and thereafter were subjected to similar dewatering and milling described below, without any conventional spray drying occurring. Two batches of silicates were prepared according to the process below and combined together to provide Example 3 silicates.

EXAMPLE 4 precipitated amorphous sodium aluminosilicate was prepared by adding 305 L of 11% sodium sulfate solution to a reactor as reaction medium and heating to 60° C. Sodium silicate (2.6 mole ratio of $SiO_2$:$Na_2O$; 0.24 kg/1) was then added at a rate of 11.7 L/min for 4 minutes as excess silicate. Next, while sodium silicate addition continued, a 0.30 kg/l aqueous solution of alum (aluminum sulfate) addition was commenced at a rate of 5.4 L/min for a total of 35 minutes. After simultaneous addition was finished, the reaction batch was heated to 71° C. and digested for 15 minutes. The reaction batch pH was readjusted to between 8.1 and 8.5 and then was discharged from the reactor.

EXAMPLE 4 silicate prepared as described above was dewatered in a J-Vap dewatering system and milled in a Raymond® mill. The dewatering and milling conditions for EXAMPLE 4 are listed in Table I and II, respectively.

TABLE I

|  | Example No. | | | |
| --- | --- | --- | --- | --- |
|  | 1 | 2 | 3 | 4 |
| Feed solids, % | 6.2 | 6.2 | 23 | 18.6 |
| Feed Temp, ° C. | 85 | 92 | 74 | 70 |
| Feed Pressure, psi | 20 | 20 | 80 | 80 |
| 1$^{rst}$ BD/SQZ | | | | |
| Pressure, psi | 20/20 | 20/20 | 20/60 | 20/60 |
| Time, min | 1 | 1 | 2 | 2 |
| Core BD | | | | |
| Pressure, psi | 20 | 20 | 80 | 80 |
| Time, sec | 15 | 15 | 20 | 20 |
| 2$^{nd}$ BD/SQZ | | | | |
| Pressure, psi | 40/40 | 40/40 | 60/95 | 60/95 |
| Time, min | 5 | 5 | 10 | 10 |
| Wash Time, min | 1.5–2 | 1.5–2 | n/a | n/a |
| Wash Temp., ° C. | 60 | 60 | n/a | n/a |
| De-Water Time, hr | 6 | 6 | 4 | 5 |
| Resulting % Solids | 74.2 | 65.7 | 68.5 | 60.3 |

COMPARATIVE EXAMPLE 2

Silica was prepared according to the silica precipitation process in EXAMPLE 2 but for comparison purposes was filtered, spray dried, and milled according to conventional methods such as that outlined in the "existing Precipitated Silica/Silicate Process" within the Sole FIGURE. After digestion, the silica was filtered, spray dried and milled as described in Comparative Example 1 but under the conditions outlined in Tables II and III.

TABLE II

| | Raymond ® Milling | | |
| --- | --- | --- | --- |
| Example | Upper & Lower Bank Whizzards) | Upper & Lower Bank Hammers | Feed Rate rpm |
| 1 | 2 (U) and 2 (L) | 0 (U) and 0 (L) | 2 |
| 2 | 8 (U) and 6 (L) | 0 (U) and 0 (L) | 1.5 |
| 3 | 12 (U) and 12 (L) | 0 (U) and 4 (L) | 2.5 |

TABLE II-continued

Raymond ® Milling

| Example | Upper & Lower Bank Whizzards) | Upper & Lower Bank Hammers | Feed Rate rpm |
|---|---|---|---|
| 4 | 8 (U) and 8 (L) | 0 (U) and 4 (L) | 2.5 |
| Comparative 1 | 12 (U) and 6 (L) | 0 (U) and 0 (L) | 3 |
| Comparative 2 | 12 (U) and 8 (L) | 0 (U) and 0 (L) | 3 |

TABLE III

| | Slurry % Solids | Spray Dryer Inlet Temp, ° C. | Spray Dryer Outlet Temp, ° C. | Resulting % Solids |
|---|---|---|---|---|
| Comparative Example 1 | 35.0 | 440 | 140 | 93 |
| Comparative Example 2 | 14.5 | 440 | 92 | 93 |

After being prepared as set forth above, several properties of the particulate silicas and silicates, including % moisture, % 325 residue, % $Na_2SO_4$, particle size, oil absorption, and the degree of light transmission ("% Transmittance") were then measured. The silica and silicate properties described herein were measured as follows:

Percent moisture is determined by weighing a 2.0 gram sample into a pre-weighed dish to the nearest 0.0001 g. The sample is placed in an oven for 2 hours at 105° C., removed and allowed to cool in a desiccator, then weighed. Percent moisture is determined by dividing the weight loss by the original sample weight and multiplying by 100.

The % 325 sieve residue was determined by weighing 50 g silica into a 1-liter beaker containing 500–600 ml water. The silica was allowed to settle into the water, then mixed well until all the material is dispersed. The water pressure was adjusted through the spray nozzle (Fulljet 9.5, ⅜ G, 316 stainless steel, Spraying Systems Co.) to 20–25 psi. The sieve screen (325 mesh screen (45 μm), 8" diameter) was held 4–6 inches below the nozzle and, while spraying, the contents of the beaker were gradually poured onto the 325 mesh screen. The remaining material was rinsed from the walls of the beaker and poured onto the screen. The screen was washed for 2 minutes, moving the spray from side to side in the screen using a sweeping motion. After spraying for 2 minutes, the residue retained on the screen was washed to one side, and then transferred it into a pre-weighed aluminum weighing dish by washing with water from a squirt bottle. The dish was allowed to stand 2–3 minutes (residue settles), then the clear water off the top is decanted. The dish was placed in an oven ("Easy-Bake" infrared oven or 105° C. oven) and dried until the residue sample reached a constant weight. The dry residue sample and dish were re-weighed. Calculation of the % 325 residue was done as follows:

$$\% \text{ 325 residue} = \frac{\text{weight of residue, g}}{\text{sample weight, g}} \times 100$$

The 5% pH is determined by weighing 5.0 grams silica into a 250-mL beaker, adding 95 mL deionized or distilled water, mixing for 7 minutes on a magnetic stir plate, and measuring the pH with a pH meter which has been standardized with two buffer solutions bracketing the expected pH range.

Percent sodium sulfate was determined by weighing 13.3 g of silica product or 12.5 g silicate sample and adding it to 240 ml of distilled water. The slurry was mixed for 5 minutes on a Hamilton Beach mixer. The slurry was transferred to a 250-ml graduated cylinder and distilled water is added to make 250 ml slurry. The sample was mixed and the temperature of the slurry is determined. The conductivity of the solution was measured using a Soul-Bridge with the temperature compensator properly adjusted. The percent sulfate was determined from a standard calibration chart.

The Median Particle Size (MPS) was determined using a Leeds and Northrup Microtrac II. A laser beam is projected through a transparent cell which contains a stream of moving particles suspended in a liquid. Light rays that strike the particles are scattered through angles that are inversely proportional to their sizes. The photodetector array measures the quantity of light at several predetermined angles. Electrical signals proportional to the measured light flux values are then processed by a microcomputer system to form a multi-channel histogram of the particle size distribution.

Oil absorption, using linseed oil, was determined by the rubout method. This method is based on a principle of mixing oil with silica by rubbing with a spatula on a smooth surface until a stiff putty-like paste is formed. By measuring the quantity of oil required to have a paste mixture which will curl when spread out, one can calculate the oil absorption value of the silica, which is the value which represents the volume of oil required per unit weight of silica to saturate the silica sorptive capacity. Calculation of the oil absorption value was done as follows:

$$\text{Oil absorption} = \frac{\text{ml oil absorbed}}{\text{weight of silica, in grams}} \times 100$$

$$= \text{ml oil}/100 \text{ gram silica}$$

As a first step in measuring the refractive index (RI) and degree of light transmission, a range of glycerin/water stock solutions (about 10) was prepared so that the refractive index of these solutions lies between about 1.428 and 1.46. The exact glycerin/water ratios needed depend on the exact glycerin used and is determined by the technician making the measurement. Typically, these stock solutions will cover the range of 71 to 91 wt. % glycerin in water. To determine Refractive Index, one or two drops of each standard solution are separately placed on the fixed plate of the refractometer (Abbe 60 Refractometer Model 10450). The covering plate is fixed and locked into place. The light source and refractometer are switched on and the refractive index of each standard solution is read.

Into separate 20 $cm^3$ bottles, 2.0 g+0.01 silica is accurately weighed and 18.0 g+0.01 of each respective stock glycerin/water solution is added to the silica. The bottles are then shaken vigorously to form silica dispersions, the stoppers removed from the bottles, and the bottles placed in a desiccator, which is then evacuated utilizing a vacuum pump. The dispersions are de-aerated for 120 minutes and visually inspected for complete de-aeration. The % transmittance (% T) at 590 nm (Spectronic 20 D+) is measured, after the samples return to room temperature (about 10 minutes) according to the manufacturer's operating instructions. Specifically, % Transmittance is measured on the silica/glycerin/water dispersions by placing an aliquot of each dispersion in a glass spectronic tube and reading the % T at 590 nm wavelength for each sample on a 0–100 scale. % Transmittance vs. RI of the stock solutions used is plotted. Refractive index of the silica is defined as the position of the plotted peak maximum and the value of the peak maximum is the silica % Transmittance.

The results of these measurements and tests for the Inventive Examples are provided below in TABLE IV.

TABLE IV

|  | Example | | | |
| --- | --- | --- | --- | --- |
|  | 1 | 2 | 3 | 4 |
| % 325 Residue | 0.1 | 0.06 | 0.00 | <0.01 |
| % Transmittance | 80.4 | 86.4 | — | — |
| % $Na_2SO_4$ | 0.5 | 0.4 | 0.7 | 1.2 |
| Oil absorption, ml/100 g | 108 | 174 | 156 | 125 |

Inventive silica 1 exhibits properties of abrasive type materials whereas inventive silica 2 exhibits thickening characteristics, both for dentifrice formulations. The inventive silicas of Example 1 and Example 2 have comparable properties of pH and moisture levels to their counterpart Comparative Examples 1 and 2 silicas made by conventional processing methods; however, the inventive silicas show far lower % 325 residue levels than these counterparts, indicating there are many fewer large-sized particles present (the two Comparative Examples exhibit % 325 residue measurements of 0.46 and 0.7, respectively). The Inventive silicas likewise exhibit much lower residual sodium sulfate amounts versus the Comparative silicas (such conventional silicas have levels from 1.5–2% on average). Thus, these Examples show that not only do lower amounts of fine particle size silicas become formed (and thus narrower particle size distributions are permitted), but also the inventive filtration and washing method step is more efficient in removing residual sodium sulfate by-product than conventional methods. Likewise, the silicate products of Examples 3 and 4 made according to the inventive process had an extremely low % 325 residue and sodium sulfate content. Examples 3 and 4 were milled to a median particle size of 5–7 μm and their resultant moisture content was 7.9 and 11.6%, respectively.

Furthermore, thickening silicas generally exhibit much higher % T and oil absorption levels due to their higher structures as compared with low-structure abrasive silicas. The resultant high % T of 80.4 for inventive silica 1 abrasive (as compared to a standard high level of about 63% T for the conventionally prepared Comparative Example 1 silica) is highly unexpected, as is the high oil absorption level exhibited by such a sample. Commonly, spray-dried dental abrasive silica materials exhibit a range of oil absorption up to at most about 95 ml/100 g; the unusually high level noted for inventive silica 1 evinces an abrasive that has excellent low-structure configuration.

As previously noted, the inventive method entails the utilization of fewer mechanical treatment process steps of the target silica materials than is required of spray-drying manufacturing procedures. With spray-drying, moisture removal is imperative, thus cake re-slurrying, cake slurry pumping, cake slurry atomizing, and powder airveying, are all necessary steps that can effect the product integrity of desired low-structure silica materials. As such, it has been found that this inventive method permits fewer mechanical process steps and provides greater product integrity in terms of low-structure results.

Additionally, the Inventive Example silicas exhibited moisture levels (% $H_2O$ by weight) of 8.1 and 8.5, respectively, and median particle sizes of 12.28 and 12.58 microns, respectively. As noted previously, it was deemed important to provide a moisture level below at most 12% by weight and a median particle size between 1 and 30 microns, preferably between 3 and 17. These Inventive Example silicas thus meet those requirements as well.

To demonstrate their efficacy in consumer products, the inventive silicas of Examples 1 and 2 were incorporated as powders into toothpaste compositions, 1 and 2, respectively), which are set forth in Table V, below. Example 1 silica represents an abrasive grade silica. Example 2 silica represents a thickener-grade silica.

The performance of toothpaste Compositions 1 and 2 was then compared to each other as were toothpaste Compositions Comparative 1 and comparative 2. Toothpaste Composition 1 was formulated with Example 1 silica abrasive made according to the inventive process, while Toothpaste Composition Comparative 1 contained Comparative Example 1 abrasive silica made according to a conventional process. Toothpaste Composition 2 was formulated with Example 2 inventive thickener silica, while Toothpaste Composition Comparative 2 contained Comparative Example 2 thickener silica made according to a conventional process.

The toothpaste compositions were prepared as follows. A first mixture was formed by combining the following components: glycerin, sorbitol, polyethylene glycol (CARBOWAX 600, from the Union Carbide Corporation, Danbury, Conn.), carboxymethylcellulose (CMC-7MXF, from the Aqualon division of Hercules Corporation, Wilmington, Del.), and then stirring the first mixture until the components dissolved. A second mixture was formed by combining the following components: deionized water, tetrasodium pyrophosphate, sodium saccharin, sodium fluoride, and then stirring until the components are dissolved. The first and second mixtures were then combined while stirring. Thereafter, color, if specified, was added and the combined mixture is stirred with a Lightnin mixer to obtain a "Premix".

The premix was placed into a Ross mixer (model 130LDM, Charles Ross & Co., Hauppauge, N.Y.), silica thickener, silica abrasive and any required TiO2 added to the premix, and the premix mixed without vacuum. Then 30 inches of vacuum was drawn and each sample mixed for 15 minutes, and then sodium lauryl sulfate and flavor was added. The resulting mixture was stirred for 5 minutes at a reduced mixing speed. The resulting dentifrice composition was sealed in plastic laminate toothpaste tubes and held under appropriate conditions for later testing. The four different toothpaste compositions were prepared according to the following formulations, wherein the amounts are gram units:

TABLE V

|  | Toothpaste Composition Number | | | |
| --- | --- | --- | --- | --- |
| Ingredients | 1 | Comparative 1 | 2 | Comparative 2 |
| Glycerin, 99.5% | 11.000 | 11.000 | 11.600 | 11.600 |
| Sorbitol, 70% | 40.007 | 40.007 | 48.007 | 48.007 |

TABLE V-continued

|  | Toothpaste Composition Number | | | |
| --- | --- | --- | --- | --- |
| Ingredients | 1 | Comparative 1 | 2 | Comparative 2 |
| Deionized Water | 20.000 | 20.000 | 11.000 | 11.000 |
| Carbowax ® 600 | 3.000 | 3.000 | 3.000 | 3.000 |
| CMC-7MXF | 1.200 | 1.200 | 0.400 | 0.400 |
| Tetrasodium pyrophosphate | 0.500 | 0.500 | 0.500 | 0.500 |
| Sodium Saccharin | 0.200 | 0.200 | 0.200 | 0.200 |
| Sodium Fluoride | 0.243 | 0.243 | 0.243 | 0.243 |
| Example 1 silica abrasive | 20.000 | 0.00 | 0.00 | 0.00 |
| Comparative Example 1 silica abrasive | 0.00 | 20.000 | 18.000 | 18.000 |
| Example 2 silica thickener | 0.00 | 0.00 | 5.00 | 0.00 |
| Comparative Example 2 silica thickener | 1.500 | 1.500 | 0.00 | 5.000 |
| 1.0% F&DC Blue #1 | 0.00 | 0.00 | 0.200 | 0.200 |
| $TiO_2$ | 0.500 | 0.500 | 0.00 | 0.00 |
| Sodium Lauryl Sulfate | 1.200 | 1.200 | 1.200 | 1.200 |
| Flavor | 0.650 | 0.650 | 0.650 | 0.650 |

Certain toothpaste properties were measured for comparison between the different types of tested silicas. Toothpaste viscosity was measured utilizing a Brookfield Viscometer Model RVT equipped with a Helipath T-F spindle and set to 5 rpm by measuring the viscosity of the toothpaste at 25° C. at three different levels as the spindle descends through the toothpaste test sample and averaging the results. The pH values of the toothpaste mixtures encountered in the present invention were be monitored by conventional pH sensitive electrodes. Aesthetic properties of toothpaste (stand-up, separation) were measured visually. About a one inch ribbon of toothpaste was squeezed from a tube onto a piece of ordinary white notebook paper. After waiting 3–5 minutes, aesthetic property observations were recorded. Stand-up refers to the shape of the toothpaste ribbon and relates to the paste's ability to stay on top of a toothbrush without sinking in-between the bristles. Separation refers to the toothpaste formulation's integrity. Solid and liquid phases of the toothpaste may separate, usually due to too little binder or thickener. Liquid will be visible around the squeezed ribbon of paste if there is separation.

To determine toothpaste fluoride availability (F/A), a soluble fluoride determination method was used. Toothpaste compositions were stored at a specified temperatures for a specified length of time in a laminated tube. Thereafter, 10 grams of the toothpaste composition were placed in a 10 ml beaker and 30 grams of distilled water was added. The mixture was stirred to form an uniformly dispersed toothpaste slurry. The slurry was subsequently centrifuged for 10 minutes at 15,000 rpm or until the supernatant was clear. Then 10 ml of the supernatant and 10 ml of pH 8 buffer (0.2 $\underline{N}$ EDTA/0.2 $\underline{N}$ THAM (2-amino-2-hydroxymethyl-1,3-propanediol), previously adjusted to pH=8.0 with NaOH) was pipetted into a plastic vial, a magnetic stir bar added and gentle stirring was initiated. The fluoride ion concentration was determined by direct potentiometry with an Orion fluoride electrode (Model 95–09) utilizing 1000 and 100 ppm F standards to set instrument calibration. Fluoride Availability is basically the percent fluoride determined in the supernatant versus that originally added to the toothpaste, based on the toothpaste abrasive loading level. In such a situation, it is generally accepted that the higher the level the better, particularly since low availability levels would indicate waste of expensive fluoride agents.

Toothpaste haze was measured utilizing a Gardner XL-835 Colorimeter by measuring light transmission. Specifically, two 38×75×1 mm microscope slides were placed on a flat surface. A plexiglass spacer (38×75×3 mm thick with a 24×47 mm cut-out open space) was placed on top of one of the slides. Toothpaste gel was squeezed into the open area of the plexiglass spacer and the second microscope slide was placed on top of the spacer with enough pressure (by hand) to eliminate excess air and toothpaste. The slide was placed on the calorimeter transmission light beam opening (haze) and the back port opening (color) and three readings were taken at different specimen spacer locations and averaged. Target specimens should have no visible air bubbles.

The Radioactive Dentin Abrasion (RDA) values of the precipitated silica compositions of this invention were determined according to the method set forth by Grabenstetter, R. J.; Broge, R. W.; Jackson, F. L.; and Radike, A. W.: "*The Measurement of the Abrasion of Human Teeth by Dentifrice Abrasives: A Test Utilizing Radioactive Teeth*", *Journal of Dental Research* 37: 1060–68, 1958, hereinafter incorporated entirely by reference.

The PCR test followed is described in "*In Vitro Removal of Stain With Dentifrice*" by G. K. Stookey, et al., *J. Dental Res.*, 61, 1236–9, 1982, hereinafter entirely incorporated by reference.

Each inventive and comparative toothpaste example formulation exhibited acceptable viscosity measurements and viscosity increases over time, proper standup properties when applied to toothbrush bristles, and effectively no separation during three weeks of storage at 80° F. Thereby, in terms of those such properties, the resultant toothpaste formulations were essentially the same in quality. However, upon measuring the PCR and RDA levels of these inventive and comparative formulations, definite and surprising differences were noticed. Such results are provided in Table VI below.

TABLE VI

|  | Toothpaste Formula # | | | |
| --- | --- | --- | --- | --- |
|  | 1 | Comparative 1 | 2 | Comparative 2 |
| RDA | 65 | 92 | — | — |
| PCR | 99 | 131 | — | — |
| Haze @ 140³C | — | — | 35.7 | 44.7 |

The results for the Toothpaste Formulation 1 containing abrasive silica made by the inventive process showed a greater ability to control RDA and PCR characteristics within the desired range of such effects. Thus, it is seen from the above data that the dentifrices formulated with the inventive silicas exhibit a distinct advantage over those made with conventionally spray dried and milled silicas in that a reduction in abrasive properties is possible through this less costly method. Additionally, the PCR/RDA ratio of the toothpaste containing the inventive abrasive silica was higher than that of its counterpart, Comparative Toothpaste 1 Surprisingly, toothpaste containing the inventive thickening silica had a lower haze rating, as compared to toothpaste containing its spray dried and milled counterpart, and thus would provide a higher clarity to a clear-gel toothpaste. All dentifrices exhibited good viscosity and aesthetic properties.

Furthermore, through empirical analysis, it was recognized that samples of the inventive silicas exhibited less dusting from a simple test wherein the samples (about 100 g each) were placed in four different 20 mL vials and turned upside down for 2 seconds, then returned to their upright positions. The comparative silicas exhibited a noticeable greater propensity to produce dustiness within the top portion of the vial thereafter than the inventive counterparts. It is believed that the production of fewer fine particle size silicas through the inventive method (a smaller particle size distribution would result in such fewer fine particles from being produced) thus prevents an appreciable amount of such particles from becoming deattached (through cohesion, most likely) from the main larger particle-sized silica particles, thereby resulting in a reduced propensity for fine particles to float into the atmosphere during use, transport, or other mechanical treatment.

It will be understood that various changes in the details, materials, and arrangements of the parts which have been described and illustrated herein in order to explain the nature of this invention may be made by those skilled in the art without departing from the principles and scope of the invention as expressed in the following claims.

What is claimed is:

1. A method for preparing particulate materials having a moisture content of at most 12%, said method comprising the steps of:
    a) introducing, into a reactor container, reaction mixture contents comprising reactants effective to form a suspension of water-insoluble particles selected from the group consisting of silica, silicates, or any mixtures thereof;
    b) feeding the resultant suspension of step "a" into a chamber in which the water-insoluble particles are subjected to a chamber filter press in order to wash and partially dewater the suspension to produce filtered particulate material;
    c) further dewatering the filtered particulate material under reduced pressure in the interior of the same chamber filter press as utilized in step "b" while simultaneously subjecting the filtered particulate material to heat to produce resultant crumble material having a solids content of 14.5 to 85% by weight; and
    d) comminuting while simultaneously heating the resultant crumble material from step "c" to provide said particulate materials exhibiting a median particle size within a range of from about 1 to 30 microns and a moisture content less than 12%.

2. The method according to claim 1, wherein said particulate materials are selected from the group consisting of precipitated silica, alkali metal aluminosilicates, alkaline earth metal silicates, and any mixtures thereof.

3. The method according to claim 1, wherein the chamber filter press within steps "b" and "c" includes a plurality of alternating i) filter plates covered by respective liquid-permeable filter membranes, and ii) diaphragm squeeze plates that each include a diaphragm that is expandable toward an adjoining filter plate; wherein the squeeze plates and filter plates define particulate material suspension flow passages therebetween at least one diaphragm and a liquid-permeable membrane associated with an adjoining filter plate, wherein at least one diaphragm is expandable toward an adjoining filter plate effective to promote solid/liquid separation in the filtered particulate material introduced into the flow passages in which liquid is transmitted through the adjoining liquid-permeable membrane; and the filter plates including respective interior filtrate drainage chambers for drainage of liquid filtered from the filtered particulate material.

4. The method according to claim 3, wherein the at least one diaphragm expands towards an adjoining filter plate by introduction of heated fluid effective to expand the diaphragm and heat the resultant crumble material effective to promote water removal.

5. The method according to claim 4, wherein the drainage chambers being connected to a vacuum source effective to remove vaporized portions of the silica or silicate crumble material.

6. The method according to claim 1, further comprising a step after step "d" of combining the particulate materials with at least one of additional water, binder, fluoride ion-providing compound, flavoring agent, coloring agent, whitening agent, preservative, tartar control compound, foaming agent, and anti-microbial agent.

* * * * *